US009911041B2

(12) United States Patent
Koga

(10) Patent No.: US 9,911,041 B2
(45) Date of Patent: Mar. 6, 2018

(54) MONITORING DEVICE, MONITORING SYSTEM AND MONITORING METHOD

(75) Inventor: Masashi Koga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1062 days.

(21) Appl. No.: 14/238,087

(22) PCT Filed: Aug. 29, 2011

(86) PCT No.: PCT/JP2011/069462
§ 371 (c)(1),
(2), (4) Date: Feb. 10, 2014

(87) PCT Pub. No.: WO2013/030929
PCT Pub. Date: Mar. 7, 2013

(65) Prior Publication Data
US 2014/0168423 A1   Jun. 19, 2014

(51) Int. Cl.
*G06K 9/00* (2006.01)
*G01B 11/00* (2006.01)
*G01B 11/03* (2006.01)
*G06T 11/60* (2006.01)
*H04W 4/04* (2009.01)

(52) U.S. Cl.
CPC .......... *G06K 9/00671* (2013.01); *G01B 11/00* (2013.01); *G01B 11/03* (2013.01); *G06T 11/60* (2013.01); *H04W 4/043* (2013.01)

(58) Field of Classification Search
CPC .................................. G06K 9/00; H04N 7/18
See application file for complete search history.

(56) References Cited

U.S. PATENT DOCUMENTS 6,067,369 A * 5/2000 Kamei ................. G06K 9/4633
382/125
7,333,631 B2 * 2/2008 Roh .................... G06K 9/00664
382/104

(Continued)

FOREIGN PATENT DOCUMENTS

JP    07-281753 A    10/1995
JP    08-304581 A    11/1996

(Continued)

OTHER PUBLICATIONS

Thrun et al., "Probabilistic Robotics", The MIT Press, 2005.

*Primary Examiner* — Alex C Dunn
(74) *Attorney, Agent, or Firm* — Mattingly & Malur, PC

(57) ABSTRACT

A monitoring device monitors facility elements in a building. Self-localization of the monitoring device is estimated by collating measured three-dimensional shapes with a map for localization including the shapes and positions of structural objects inside a building excluding the shapes and positions of facility elements. The monitoring device extracts the shape and position of a facility element candidate from the measured three-dimensional shapes; and calculates a similarity between the shape and position of each of the facility elements in the periphery of the self-localization extracted from the facility element collation map. The monitoring device identifies which of the facility elements in the periphery of the self-localization extracted from the facility element collation map is the facility element candidate extracted from the measured three-dimensional shape on the basis of the calculated similarity.

15 Claims, 15 Drawing Sheets

(56) References Cited

U.S. PATENT DOCUMENTS

| | | | | |
|---|---|---|---|---|
| 8,024,072 B2* | 9/2011 | Park | ............................ | B25J 5/00 |
| | | | | 700/259 |
| 8,306,738 B2* | 11/2012 | Kong | ................... | G05D 1/0274 |
| | | | | 700/245 |
| 8,635,015 B2* | 1/2014 | Anderson | ................. | G01S 1/70 |
| | | | | 701/1 |
| 8,659,593 B2* | 2/2014 | Furukawa | ............... | G01B 11/24 |
| | | | | 345/419 |
| 8,891,816 B2* | 11/2014 | Billingham | ........ | G06K 9/00677 |
| | | | | 348/113 |
| 2001/0033260 A1* | 10/2001 | Nishitani | ............. | G09G 3/3406 |
| | | | | 345/87 |
| 2005/0285941 A1* | 12/2005 | Haigh | .............. | G08B 13/19602 |
| | | | | 348/155 |
| 2008/0310680 A1* | 12/2008 | Azuma | .............. | G06K 9/00791 |
| | | | | 382/104 |
| 2009/0184961 A1* | 7/2009 | Hayashi | ................. | G01B 11/24 |
| | | | | 345/424 |
| 2010/0208972 A1* | 8/2010 | Bouchard | ............ | G01F 23/288 |
| | | | | 382/132 |
| 2011/0097014 A1* | 4/2011 | Lin | ...................... | G01C 15/002 |
| | | | | 382/284 |
| 2011/0164569 A1* | 7/2011 | Bamberger | ........... | H04W 64/00 |
| | | | | 370/328 |
| 2013/0250101 A1* | 9/2013 | Lavery | ................... | G10L 25/78 |
| | | | | 348/135 |

FOREIGN PATENT DOCUMENTS

| | | |
|---|---|---|
| JP | 2004-347488 A | 12/2004 |
| JP | 2007-322138 A | 12/2007 |
| JP | 2009-236774 A | 10/2009 |

* cited by examiner

FIG. 7

| FACILITY ID (701) | SHAPE TYPE (702) | POSITION AND SIZE (703) | 412 |
|---|---|---|---|
| 1 | 1 | x, y, r | |
| 2 | ... | ... | |
| ⋮ | ⋮ | ⋮ | |

FACILITY ELEMENT COLLATION MAP

FIG. 8

| FACILITY ID (801) | VARIANCE (802) | CORRECTION COEFFICIENT (803) | 413 |
|---|---|---|---|
| 1 | $\sigma_1^2, \sigma_2^2$ | ... | |
| 2 | ... | ... | |
| ⋮ | ⋮ | ⋮ | |

INSTALLATION ERROR STATISTICAL MODEL

FIG. 9

| FACILITY ID (901) | LOWER LIMIT TEMPERATURE (902) | UPPER LIMIT TEMPERATURE (903) | 415 |
|---|---|---|---|
| 1 | 50°C | 85°C | |
| 2 | ... | ... | |
| ⋮ | ⋮ | ⋮ | |

STANDARD TEMPERATURE DATA

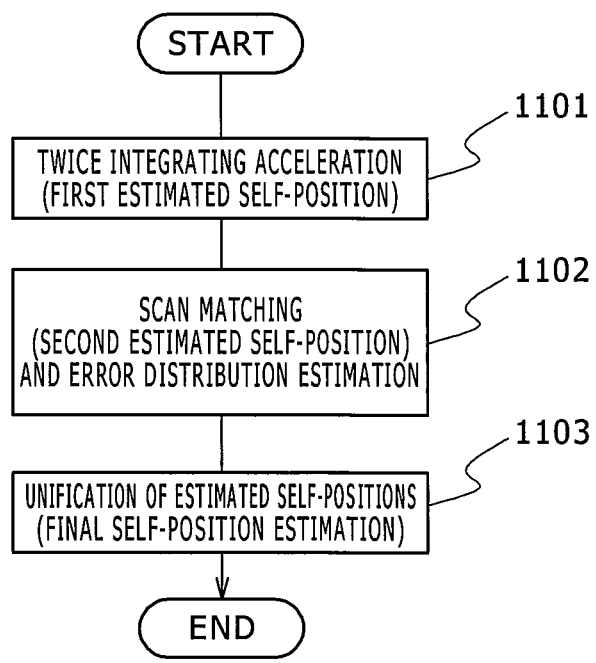

MONITORING DEVICE, MONITORING SYSTEM AND MONITORING METHOD

TECHNICAL FIELD

The present invention relates to a technology for monitoring facility elements inside a building.

BACKGROUND ART

In the case where facility elements inside a building are monitored with the use of a monitoring device, it is necessary that the self-localization of the monitoring device inside the building should be estimated.

Because a GPS (global positioning system) cannot be used inside a building, any of self-localization estimation methods is needed instead of the GPS. One of such self-localization estimation methods that can be used is a self-localization estimation method for a self-running robot disclosed in Nonpatent Literature 1.

According to this method, the self-localization of a monitoring device can be estimated by measuring the shapes and positions of peripheral objects with the use of a laser range finder disclosed in Patent Literature 1 and by collating (matching) the measured result with a prepared map. Such a self-localization estimation method is called a scan matching.

CITATION LIST

Patent Literature

Patent Literature 1: Japanese Unexamined Patent Application Publication No. 2009-236774

Nonpatent Literature

Nonpatent Literature 1: Sebastian Thrun, Wolfram Burgard, Dieter Fox, "Probabilistic Robotics", The MIT Press, 2005

SUMMARY OF INVENTION

Technical Problem

Although the self-localization can be estimated with the use of the method disclosed in Nonpatent Literature 1, it is impossible to identify a facility element under monitoring. In order to make monitoring more useful, it is desirable that a monitoring device should be capable of identifying what is a facility element under monitoring as well as estimating the self-localization.

An object of the present invention is to make a monitoring device that monitors facility elements inside a building capable of identifying what is a facility element under monitoring.

Solution to Problem

The following is a representative example of the present invention disclosed in this application. Specifically, the representative example is a monitoring device that monitors facility elements in a building, and this monitoring device includes: a three-dimensional measurement unit for measuring a three-dimensional shape in the periphery of the monitoring device; a self-localization estimation unit for estimating the self-localization of the monitoring device by collating the measured three-dimensional shape with a map for localization including the shapes and positions of structural objects inside the building excluding the shapes and positions of the facility elements; a peripheral facility element extraction unit for extracting facility elements in the periphery of the estimated self-localization from a facility element collation map including the shapes and positions of the facility elements inside the building; a facility element candidate extraction unit for extracting the shape and position of a facility element candidate from the measured three-dimensional shape; a similarity evaluation unit for calculating a similarity between the shape and position of each of the facility elements in the periphery of the self-localization position extracted from the facility element collation map and the shape and position of the facility element candidate extracted from the measured three-dimensional shape on the basis of the error distribution of the shape and position of the facility element in the periphery of the self-localization position and the error distribution of the shape and position of the facility element candidate extracted from the measured three-dimensional shape; and a facility element identification unit for identifying which of the facility elements in the periphery of the self-localization extracted from the facility element collation map is the facility element candidate extracted from the measured three-dimensional shape on the basis of the calculated similarity.

Advantageous Effects of Invention

According to a representative embodiment of the present invention, not only the self-localization can be estimated but also a facility element under monitoring can be identified.

BRIEF DESCRIPTION OF DRAWINGS

FIG. 7 is a diagram for explaining the configuration of a facility element collation map according to the first embodiment.

FIG. 8 is a diagram for explaining the configuration of a statistical model for installation error according to the first embodiment.

FIG. 9 is a diagram for explaining the configuration of standard temperature data according to the first embodiment.

FIG. 10 is a diagram for explaining the configuration of schematic diagram data according to the first embodiment.

FIG. 11 is the flowchart of self-localization estimation processing according to the first embodiment.

DESCRIPTION OF EMBODIMENTS

Hereinafter, the embodiments of the present invention will be described with reference to the accompanying drawings.

First Embodiment

A typical example of the present invention will be described in a first embodiment of the present invention.

There are many cases where the operation statuses of electric power generation/distribution facilities, chemical plants, and the like are monitored by a monitoring system such as a SCADA (supervisory control and data acquisition) system, and, in a monitoring operation, it is needed that the corresponding relationship between a facility element under monitoring and the corresponding facility element managed by the monitoring system should be secured with a high reliability.

This is because, in order to judge whether a facility element under monitoring is abnormal or not on the basis of a certain measured physical quantity of the facility element, it is necessary that the facility element should be identified and the normal range of the physical quantity to be used for the judgment should be obtained from the corresponding database. In addition, this is because, if the abnormality of the facility element is detected, it is necessary to take appropriate measures (such as a field examination and repairs) based on the facility element.

Therefore, the monitoring device according to the first embodiment of the present invention is configured to be able to not only estimate the self-localization of the monitoring device but also identify what is a facility element under monitoring. In addition, the monitoring device is configured to be able to judge whether the facility element under monitoring is abnormal or not on the basis of a physical quantity of the facility element under monitoring.

Figure 1:
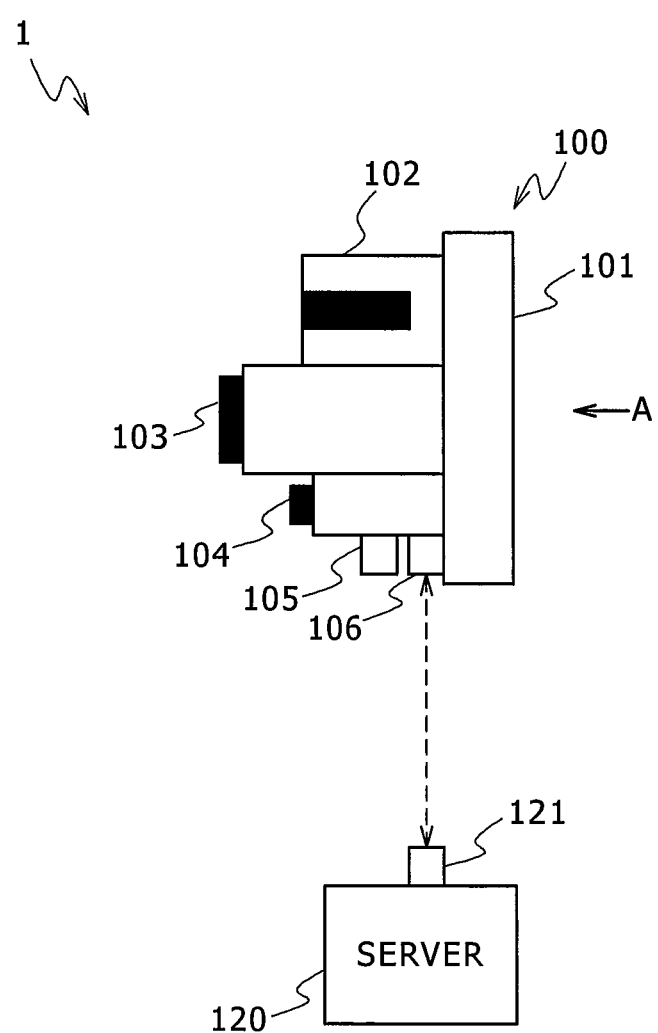
FIG. 1 is the outline block diagram of a monitoring device according to a first embodiment.

FIG. 1 is a diagram showing an outline configuration of the monitoring device 100 according to the first embodiment of the present invention.

The monitoring device 100 includes a body 101, sensors 102 to 105, and a wireless communication device 106. In a monitoring operation, an operator holds the body 101 and trains the sensors 102 to 105 forward to measure the periphery of the monitoring device 100 with the use of the sensors 102 to 105. Here, the term "building" includes any of houses for electric power generation/distribution facilities, chemical plants, and the like, and the term "facility element" includes any of elements that are installed inside the building such as pipes, pumps, and valves.

The sensors 102 to 105 are fixed on the front of the body 101. The sensors 102 to 105 are respectively a laser range finder (also referred to as a scanner type range sensor) 102, a thermal infrared camera 103, a visible light camera 104, and an acceleration sensor 105.

The laser range finder 102 includes a laser irradiation unit and a light reception unit. The laser range finder 102 radially eradiates a laser beam from the laser irradiation unit using a rotary reflecting mirror or the like, and receives the laser beam that is reflected by the surface of a nearby object at the light reception unit, and measures the distance to the nearby object by measuring the time between the eradiation of the laser beam and the reception of the reflected laser beam. The laser range finder 102 can measure a three-dimensional shape in the periphery of the monitoring device 100 by making measurements in various directions. Here, the term "periphery" is an area of a predefined radius with a center as the monitoring device 100 (for example, an area a distance to which the laser range finder 102 can measure).

The thermal infrared camera 103 includes a CCD (charge coupled device) image sensor that has a sensitivity distribution in the infrared region. The infrared camera 103 measures the intensity (or wavelength) of the radiant heat from the facility element under monitoring, that is, measures the temperature of the facility element under monitoring.

The visible light camera 104 includes a CCD image sensor that has a sensitivity distribution in the visible light region. The visible light camera 104 obtains the visible light image of the facility element under monitoring. In addition, it is also conceivable that the infrared camera 103 and the visible light camera 104 are integrated into one CCD image sensor.

The acceleration sensor 105 includes a semiconductor type accelerometer and a gyroscope, and measures accelerations in the directions of three axes of the monitoring device 100 and roll accelerations around the three axes of the monitoring device 100.

The wireless communication device 106 is a device for connecting the monitoring device 100 to an external server 120 and for exchanging data (for example, the facility ID, position, temperature, and abnormality detection result of a facility element under monitoring) with the server 120. For example, the transceiver module of a wireless LAN can be used as the wireless communication device 106.

The monitoring device 100 and the server 120 can be connected with the use of a wire communication. In this case, the monitoring device 100 and the server 120 are connected with the use of a serial interface connection such as a wire LAN interface connection, or a USB connection. In addition, the monitoring device 100 and the server 120 can communicate with each other in real time, or can be communicate with each other when needed.

Figure 2:
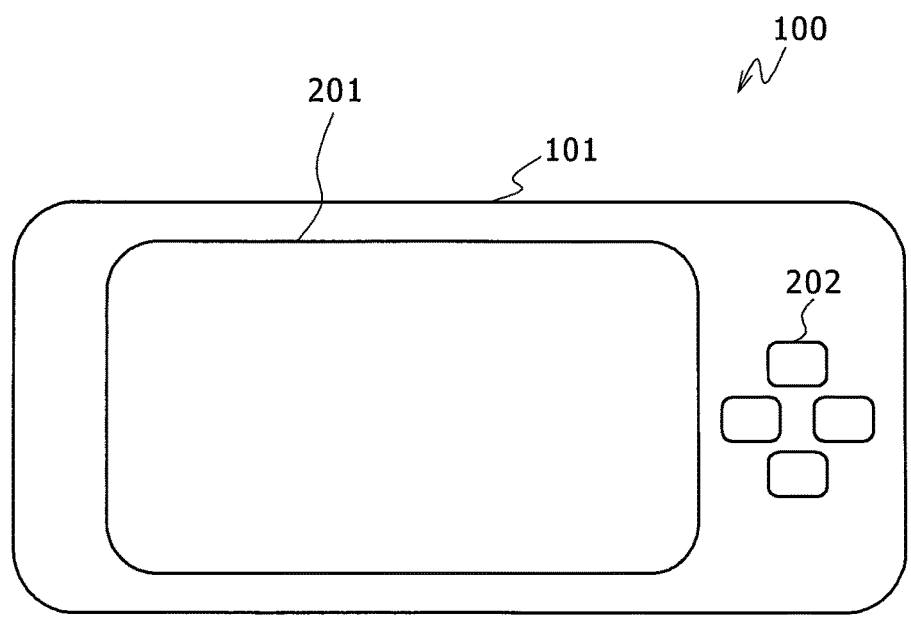
FIG. 2 is the fragmentary diagram of FIG. 1 taken in the direction of an arrow A.

The body 101 includes a processor for processing data, a memory for storing data, and the like in its inside. In addition, the body 101 includes an operation unit 202 with a display 201 and buttons 202 in its rear, for example, as shown in FIG. 2.

The server 120 includes a wireless communication device 121 for exchanging data with the monitoring device 100. For example, a wireless LAN module can be used as the wireless communication device 121.

Figure 3:
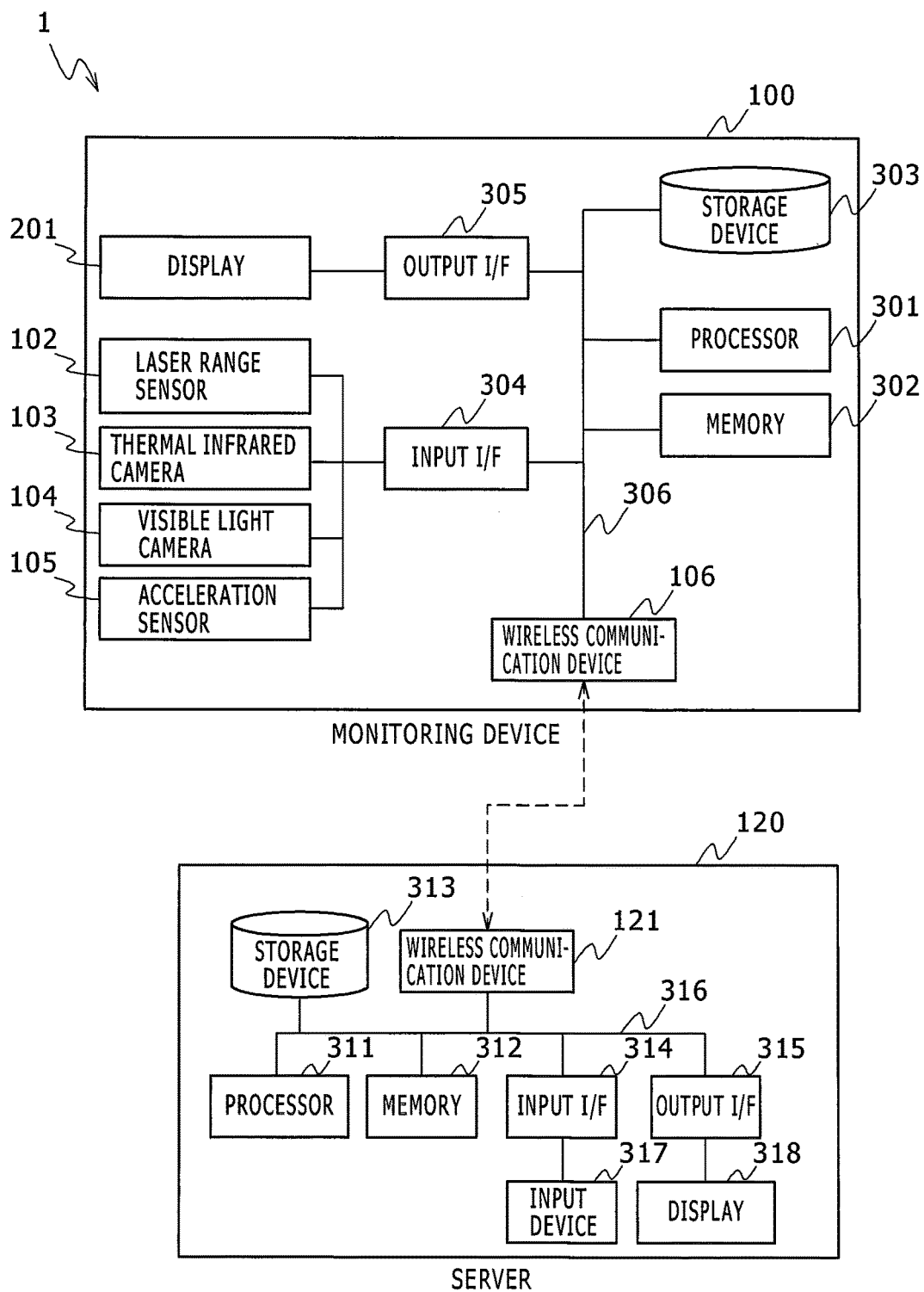
FIG. 3 is a block diagram showing the hardware configuration of a monitoring system including the monitoring device and a server according to the first embodiment.

FIG. 3 is a block diagram showing the hardware configuration of a monitoring system 1 including the monitoring device 100 and the server 120.

The monitoring device 100 is a computer including a processor 301, a memory 302, a storage device 303, an input interface 304, an output interface 305, and a wireless communication device 106. These components 301 to 305 and 106 are connected to each other via a bus 306. The processor 301 executes programs stored in the memory 302.

The memory 302 is a volatile storage device such as a DRAM, and stores the programs the processor 301 executes. Specifically, the memory 302 stores the programs for implementing a self-localization estimation unit 401, a facility element identification unit 402, a coordination system correction unit 403, 3D mapping units 404 and 405, an abnormality detection unit 406, and an image superimposition unit 407. In addition, the memory 302 stores an operating system (OS). The fundamental functions of the computer are realized by the processor 301's execution of the operating system.

The storage device 303 is a nonvolatile storage device such as a magnetic disk drive, or a flash memory, and stores data used by the processor 301 when the processor 301 executes the programs. Specifically, the storage device 303 stores a map for localization 411, a facility element collation map 412, a statistical model for installation error 413, a facility CAD coordinate system 414, standard temperature data 415, and schematic diagram data 416, shown in FIG. 4.

It has been described above that the memory 302 stores the programs for implementing the function units 401 to 407 of the monitoring device 100, and the storage device 303 stores the data 411 to 416 used by the function units 401 to 407, but in reality, the programs for implementing the function units 401 to 407 are stored in the storage device 303, and read out from the storage device 303 and loaded into the memory 302 when the programs are executed. In addition, the data 411 to 416 are also read out from the storage device 303, and loaded into the memory 302 when the programs need these data.

The sensors 102 to 105 are connected to the input interface 304. The display 201 is connected to the output interface 305.

The server 120 is a computer including a processor 311, a memory 312, a storage device 313, an input interface 314, an output interface 315, and a wireless communication device 121. These components 311 to 315 and 121 are connected to each other via a bus 316. The processor 311 executes programs (including software and the like for managing facility elements and the monitoring device 100) stored in the memory 312.

The memory 312 is a volatile storage device such as a DRAM, and stores the programs the processor 311 executes. In addition, the memory 312 stores an operating system (OS). The fundamental functions of the computer are realized by the processor 311's execution of the operating system.

The storage device 313 is a nonvolatile storage device such as a magnetic disk drive, or a flash memory, and stores data used by the processor 311 when the processor 311 executes the programs.

Here, the programs are stored in the storage device 313, and read out from the storage device 313 and loaded into the memory 312 when the programs are executed. In addition, the data are also read out from the storage device 313, and loaded into the memory 312 when the programs need the data.

An input device 317 such as a keyboard or a mouse is connected to the input interface 314. A display 318 is connected to the output interface 315.

Figure 4:
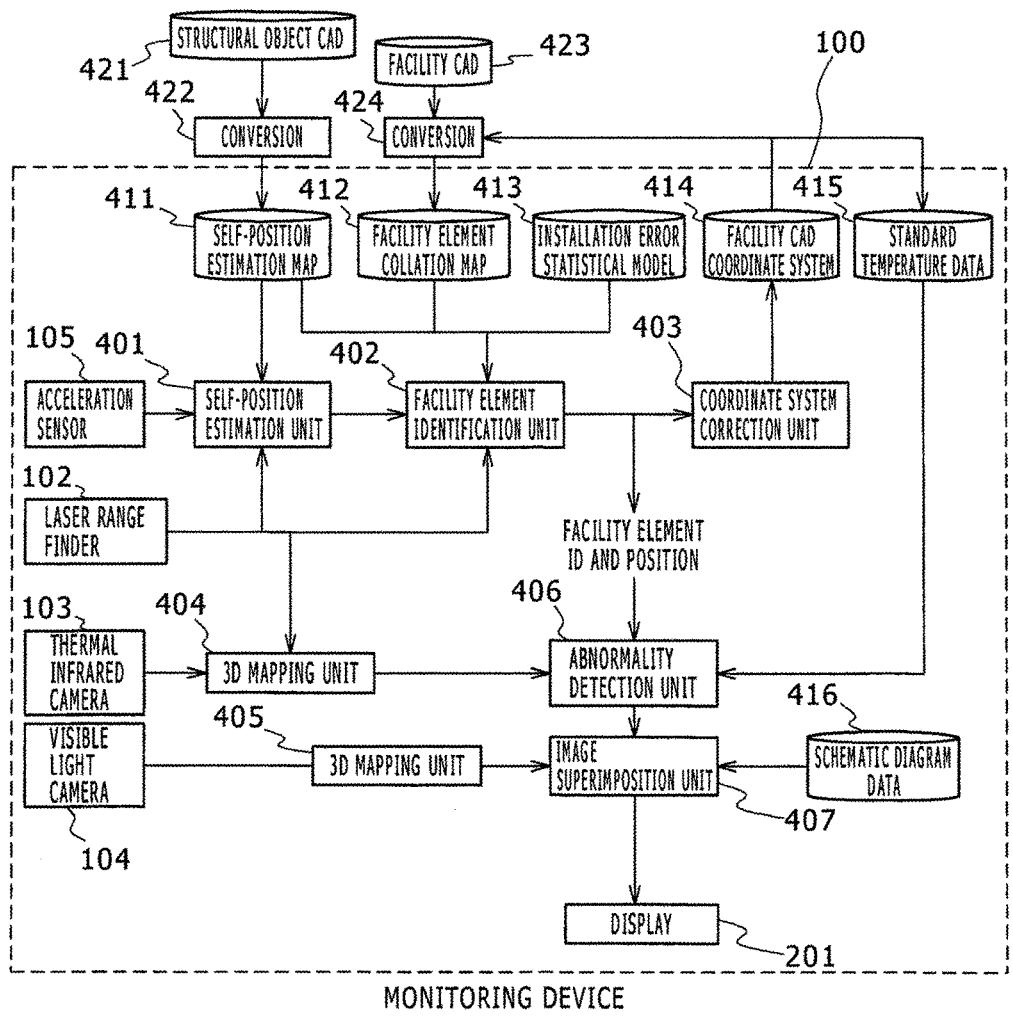
FIG. 4 is a function block diagram showing the logical configuration of the monitoring device according to the first embodiment.

FIG. 4 is a function block diagram showing the logical configuration of the monitoring device 100.

The monitoring device 100 is depicted as a part enclosed by a dashed line in FIG. 4, and includes the sensors 102 to 105, the display 201, the function units 401 to 407, and the data 411 to 416.

First, the configuration of the data 411 to 416 used by the function units 401 to 407 will be described. The data 411 to 416 are created in advance before a monitoring operation, and stored in the storage device 313 of the monitoring device 100. Here, the configuration of the data that will be described hereinafter is an exemplary configuration, and the data can be configured in other formats.

The map for localization 411 is a map including the shapes and positions of structural objects inside a building (fixed objects that have small installation errors and whose positions and directions are unchanged) such as walls and columns. The map for localization 411 is created through conversion processing 422 in which the format of data regarding walls, columns, and the like managed by a structural object CAD (computer aided design) 421, that is, the format of design data regarding a building, are converted into a format suitable for self-localization estimation.

The format suitable for the self-localization estimation is a format suitable for collation with a three-dimensional shape measured by the laser range finder 102. For example, the map for localization 411 includes the surface shapes of structural objects inside a building.

Figure 6A:
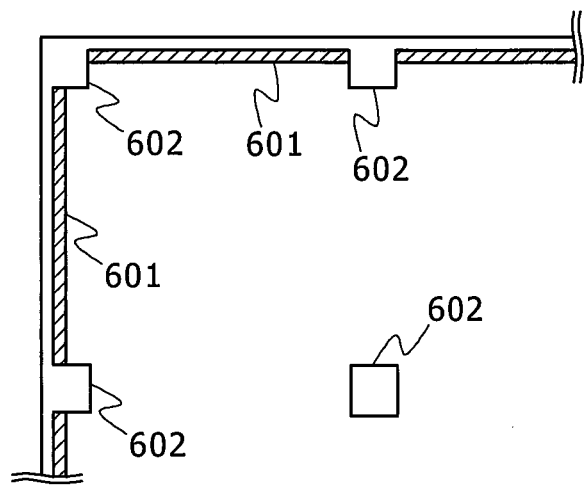
FIG. 6A is a diagram showing a data example stored in a structural object CAD according to the first embodiment.
Figure 6B:
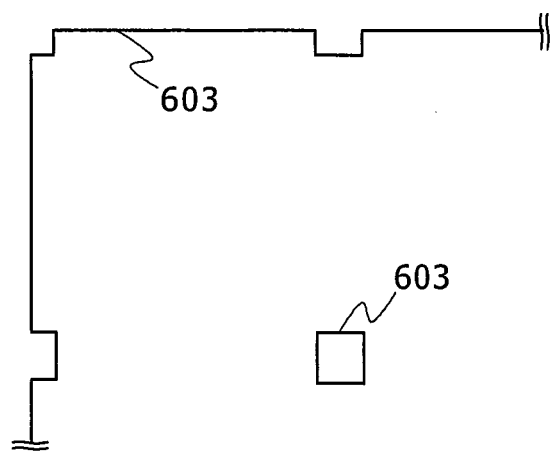
FIG. 6B is a diagram showing an example of a map for localization created from the data stored in the structural object CAD.

FIG. 6A and FIG. 6B are respectively a concrete example of the structural object CAD 421 and a concrete example of the map for localization 411. As shown in FIG. 6A, the structural object CAD 421 includes data regarding structural objects such as a wall 601 and a column 602, and as shown in FIG. 6B, the map for localization 411 includes only data regarding the surfaces 603 of the structural objects.

Here, because the map for localization 411 is a map created from the structural object CAD 421, the map for localization 411 does not include data regarding facility elements such as pipes, pumps, and valves.

The facility element collation map 412 is created through conversion processing 424 in which the shapes and positions, and the like of facility elements such as pipes, pumps, and valves managed by a facility CAD 423 are converted.

The conversion processing 424 includes coordinate conversion for aligning the position of the map for localization 411 and the position of the facility element collation map 412 on the basis of numerical values stored in the facility CAD coordinate system 414 (such as the values of a position deviation, a direction deviation, and a scale deviation necessary for aligning the position of the map for localization 411 and the position of the facility element collation map 412).

FIG. 7 is a diagram for explaining the configuration of the facility element collation map 412.

The facility element collation map 412 is a table including Facility ID 701, Shape Type 702, and Position and Size 703.

Facility ID 701 stores identifiers uniquely given to individual facility elements such as pipes and pumps. Facility ID 701 is commonly used by the facility error statistical model 413, the standard temperature data 415, and the schematic diagram data 416.

Shape Type 702 stores identifiers given in accordance with the shape types of facility elements. For example, 1 is given to a circular cylinder, and 2 is given to a rectangular solid.

Position and Size 703 stores numerical values for defining the positions, sizes, and the like of facility elements in accordance with the shape types of the facility elements. In the case of a circular cylinder, Position and Size 703 stores the center coordinates x, y, and the radius r, for example.

FIG. 8 is a diagram for explaining the configuration of the statistical model for installation error 413.

The statistical model for installation error 413 is a table including Facility ID 801, Variance 802, and Correction Coefficient 803.

Facility ID 801 stores identifiers uniquely given to individual facility elements such as pipes and pumps. Facility ID 801 is commonly used by the facility element collation map 412 and the like.

Variance 802 stores parameters showing the error distributions of the installation positions of facility elements. Here, it will be assumed that an error distribution is represented by a two-dimensional probability distribution. For example, if a facility element is a pipe (circular cylinder) vertically installed, Variance 802 stores variance values $\sigma_1^2$ and $\sigma_2^2$ with reference to the plane perpendicular to the central axis of the pipe.

Correction Coefficient 803 stores correction coefficients used in the case where the shapes of the error distributions of facility elements are changed owing to the installation locations and installation methods of the facility elements. For example, in the case where a pipe is installed along a wall, if, while the distance between the pipe and the wall is strictly regulated, the installation error of the pipe in the direction parallel with the wall is comparatively tolerated, Correction Coefficient 803 stores a correction coefficient that is used for correcting the error distribution of the installation error so that the error distribution forms an ellipse being long in the direction parallel to the wall.

In general, the data stored in Variance 802 and Correction Coefficient 803 are set in accordance with the types, installation locations, and installation methods of facility elements in view of their past records, but they can be created for each facility element.

The facility CAD coordinate system 414 (not shown in the figure) includes numerical values necessary for aligning the position of the map for localization 411 and the position of the facility element collation map 412 such as the value of a position deviation, a direction deviation, and a scale deviation.

FIG. 9 is a diagram for explaining the configuration of the standard temperature data 415.

The standard temperature data 415 is a table including Facility ID 901, Lower Limit Temperature 902, and Upper Limit Temperature 903.

Facility ID 901 stores identifiers uniquely given to facility elements such as pipes and pumps. Facility ID 901 is commonly used by the facility element collation map 412 and the like.

Lower Limit Temperature 902 stores the lower limit temperatures of facility elements, and Upper Limit Temperature 903 stores the lower limit temperatures of the facility elements. A temperature range within which each facility element can normally operate is stipulated by the data stored in Lower Limit Temperature 902 and Upper Limit Temperature 903.

FIG. 10 is a diagram for explaining the configuration of the schematic diagram data 416.

The schematic diagram data 416 is a table including Facility ID 1001, Connection Source 1002, and Connection Destination 1003.

Facility ID 1001 stores identifiers uniquely given to individual facility elements such as pipes and pumps. Facility ID 1001 is commonly used by the facility element collation map 412 and the like.

Connection Source 1002 stores the identifier of a facility element that is connected to the upstream of a certain facility element. If there are plural facility elements connected to the upstream of the certain facility element, Connection Source 1002 stores the identifiers of the plural facility elements.

Connection Destination 1003 stores the identifier of a facility element that is connected to the downstream of the certain facility element. If there are plural facility elements connected to the downstream of the certain facility element, Connection Destination 1003 stores plural identifiers of the facility elements.

Next, returning to FIG. 4, the functions of the function units 401 to 407 of the monitoring device 100 will be described.

The map for localization 401 estimates the self-localization of the monitoring device 100 ("position" includes the direction of the monitoring device 100) on the basis of plural measurement results. Specifically, the map for localization 401 twice integrates an acceleration measured by the acceleration sensor 105 to calculate a first estimated self-localization, and then calculates a second estimated self-localization by collating a peripheral three-dimensional shape measured by the laser finder 102 with the map for localization 401. Subsequently, the map for localization 401 unifies these two estimated self-localization that includes variations based on statistical errors with the use of a Kalman filter to estimate the most likely self-localization.

In addition, the detail of self-localization estimation processing will be described later with reference to a concrete example.

The facility element identification unit 402 identifies the facility ID and position of each of facility elements under monitoring with the use of the self-localization estimated by the self-localization estimation unit 401 and a three-dimensional measurement result obtained by the laser range finder 102.

Figure 5:
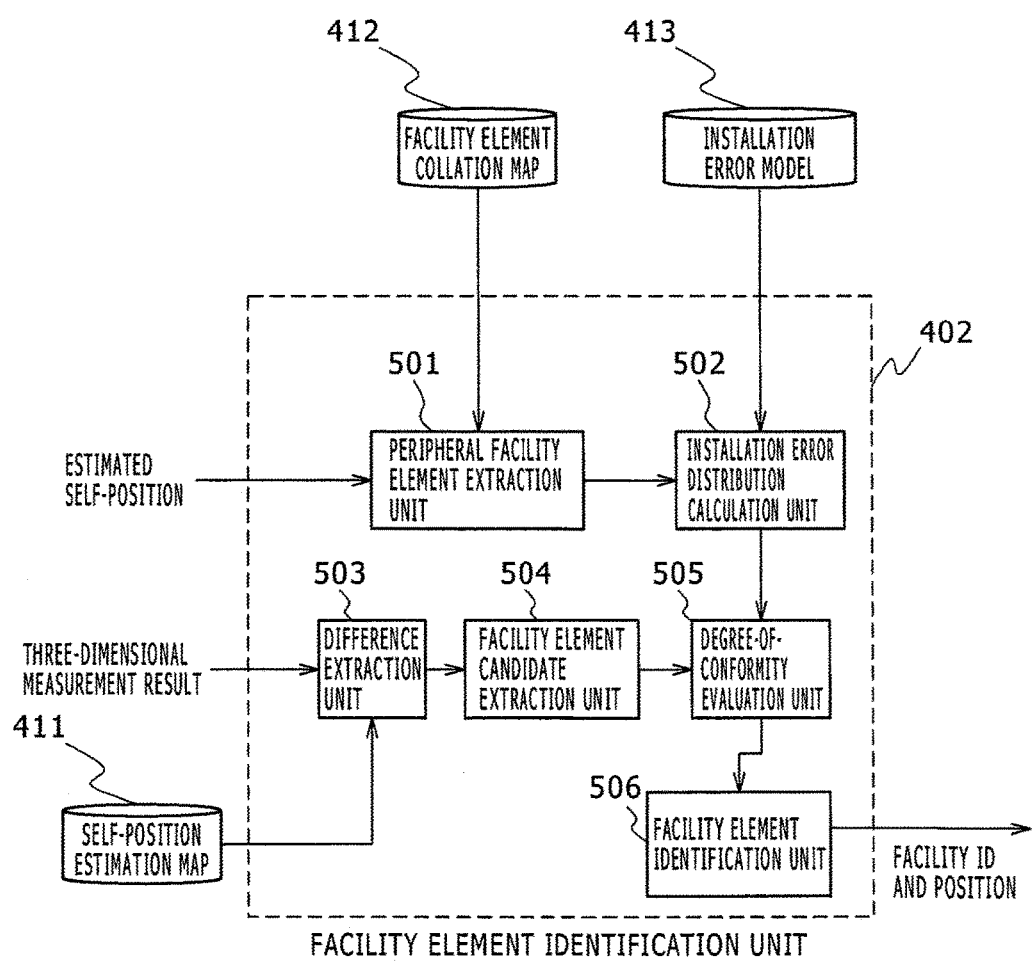
FIG. 5 is a function block diagram showing the detail of a facility element identification unit according to the first embodiment.

FIG. 5 is a function block diagram showing the detail of the facility element identification unit 402.

The facility element identification unit 402 includes a peripheral facility element extraction unit 501, an installation error distribution calculation unit 502, a difference extraction unit 503, a facility element candidate extraction unit 504, a similarity evaluation unit 505, and a facility element identification unit 506.

The peripheral facility element extraction unit 501 searches for the shape types and positions/sizes that is, the shapes and positions of facility elements in the periphery of the self-localization from the facility element collation map 413 on the basis of the self-localization estimated by the self-localization estimation unit 401, and extracts the facility elements with the searched-for shapes and positions as the peripheral facility elements.

The installation error distribution calculation unit 502 searches for the variance and correction coefficient of facility ID corresponding to each of the peripheral facility elements extracted by the peripheral facility element extraction unit 501 with reference to the statistical model for installation error 413, and calculates an installation error distribution on the basis of the searched-for variances and correction coefficient.

The difference extraction unit 503 calculates a difference between the three-dimensional measurement result obtained by the laser range finder 102 and the map for localization 411. With the above calculation, a group of measurement points regarding structural objects within a building such as walls and columns are removed from the three-dimensional measurement result, and only a group of measurement points regarding objects other than the structural objects within the building, that is, a group of measurement points regarding the facility elements is extracted as the difference.

The facility element candidate extraction unit 504 detects shapes and positions corresponding to the facility elements such as planes and circular cylinders from the difference extracted by the difference extraction unit 503 with the use of a least-squares method, a Hough conversion method, or the like, and extracts the detected shapes and positions as facility element candidates.

In the case of using the least-squares method, by predicting a shape that exists in the periphery of the self-localization to a certain degree on the basis of the shapes and positions, and the like of the peripheral facility elements extracted by the peripheral facility element extraction unit 501, and while the predicted shape and position is being changed, a shape and position that makes the sum of the square error the least is searched for, and the shape and position that makes the square error the least is extracted as a facility element candidate.

In the case of using the Hough conversion method, a poll with the use of parameters corresponding to a shape to be searched for is conducted, and the shape is searched for on the basis of the result of the poll. For example, in the case of a circular cylinder, a poll with the use of three parameters of arbitrary values for a radius r and central coordinates x, y regarding every measured point is conducted, and under the assumption that a circular cylinder that has collected the largest number of ballots most likely exists, the shape and position of the circular cylinder is extracted as a facility element candidate.

In addition, the facility element candidate extraction unit 504 calculates an estimation error distribution that shows statistical errors included in the extracted facility element candidate as well. For example, in the case where a facility element candidate is extracted with the use of the least-squares method, the estimation error distribution is calculated by adding a tinge of a known self-localization estimation error to the sum of the square errors.

The similarity evaluation unit 505 calculates a similarity between each of all the combinations of the installation error distributions of the peripheral facility elements obtained by the installation error distribution calculation unit 502 and the estimation error distributions of the facility element candidates extracted by the facility element candidate extraction unit 504. A similarity is the maximum value of a unified error distribution that is obtained by unifying an installation error distribution and an estimation error distribution.

The facility element identification unit 506 extracts a combination that has the largest similarity of all the combinations. Because the combination that has the largest similarity is the most likely combination, it becomes possible to identify to which of the peripheral facility elements the facility element candidate extracted by the facility element candidate extraction unit 504 corresponds. In other words, the facility ID of the facility element under monitoring can be identified. In addition, because a position that shows the maximum value of the unified error distribution is most likely to be the position of the facility element under monitoring, the position of the facility element under monitoring can be also identified.

In addition, the detail of the facility element identification processing will be described later with reference to a concrete example.

Returning to FIG. 4 again, the description of the functions of the function units 401 to 407 of the monitoring device 100 will be continued. The coordinate system correction unit 403 calculates the deviation between the map for localization 411 and the facility element collation map 412 on the basis of the position of the facility element identified by the facility element identification unit 402, and corrects the numerical values stored in the facility CAD coordinate system 414 (such as the values of a position deviation, a direction deviation, and a scale deviation necessary for aligning the position of the map for localization 411 and the position of the facility element collation map 412). With the above correction, when the facility element collation map 412 is next created by the conversion processing 424, the deviation between the map for localization 411 and the facility element collation map 412 is reduced.

The 3D mapping unit 404 unifies the temperature of a facility element under monitoring measured by the thermal infrared camera 103 and the distance/direction of the facility element under monitoring measured by the laser range finder 102, and calculates a three-dimensional temperature distribution.

The 3D mapping unit 405 unifies the visible light image of the facility element under monitoring measured by the visible light camera 104 and the distance/direction of the facility element under monitoring measured by the laser range finder 102, and converts the visible light image into a three-dimensional image.

The abnormality detection unit 406 searches for and obtains the lower limit temperature and the upper limit temperature corresponding to the facility ID of the facility element under monitoring with reference to the standard temperature data 415, and at the same time obtains the temperature of the facility element under monitoring from the 3D mapping unit 404. The abnormality detection unit 406 compares the lower limit temperature, the upper limit temperature, and the temperature of the facility element under monitoring, and if the temperature of the facility element under monitoring is lower than the lower limit temperature, or if the temperature of the facility element under monitoring is higher than the upper limit temperature, the abnormality detection unit 406 judges that the facility element is abnormal.

The image superimposition unit 407 creates a superimposed image by superimposing the three-dimensional temperature distribution calculated by the 3D mapping 404 on the visible light image that has been converted into the three-dimensional image calculated by the 3D mapping 405. Subsequently, the image superimposition unit 407 converts the created superimposed image into a two-dimensional image by projecting the superimposed image on a plane surface, and outputs the two-dimensional image to the display 201.

The temperature-different parts of the superimposed temperature distribution are distinguished in such a way that parts whose temperature are higher than the upper limit temperature are colored red and the other parts are colored colorless. It is all right if the temperature-different parts are distinguished by their colors being continuously changed in accordance with their temperatures. In addition, an appropriate transmittance is set to the temperature distribution in order for an operator to check the visible light image even in the state of the temperature being superimposed on the visible light image.

In addition, on the basis of the connection information among the facility elements stored in the schematic diagram data 416, the image superimposition unit 407 creates a schematic diagram that visually shows the connection relationship among the facility elements. In addition, the image superimposition unit 407 puts a mark (for example, a colored circle) on a part corresponding to a facility element at which an abnormality is detected by the abnormality detection unit 406, and outputs the schematic diagram on the display 201.

Figure 22:
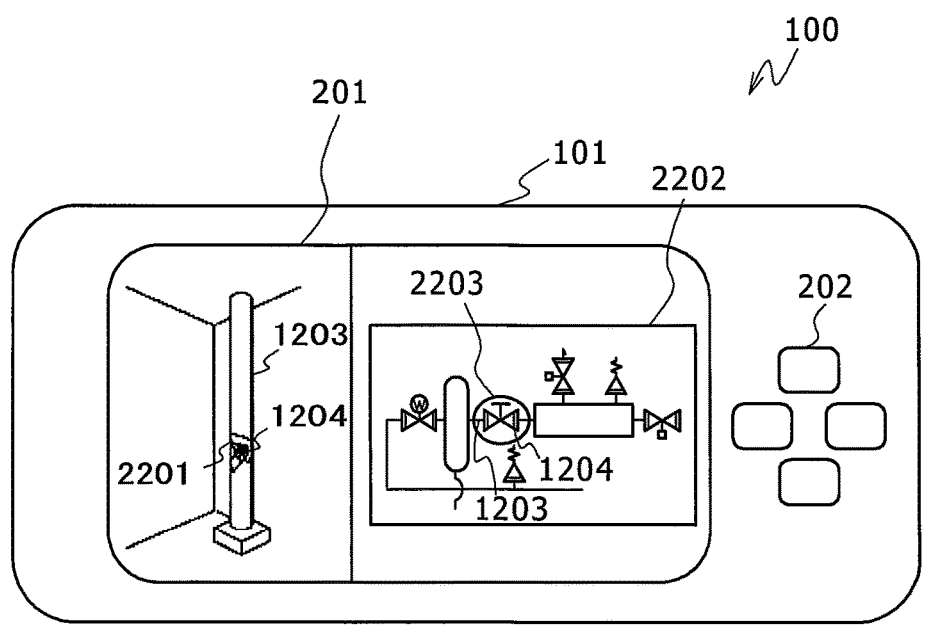
FIG. 22 is a diagram showing a display example of a display screen according to the first embodiment.

The display 201 displays the superimposed image and the schematic diagram input by the image superimposition unit 407. FIG. 22 is a diagram showing a concrete example of the display, which will be described in detail later.

Next, the details of the self-localization estimation processing and facility element identification processing will be described with reference to a concrete example.

Figure 12:
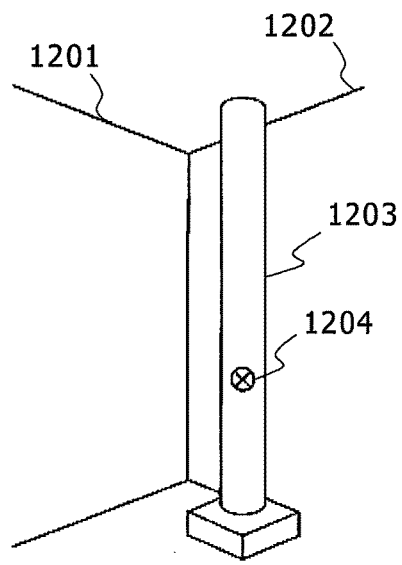
FIG. 12 is a diagram showing examples of facility elements monitored by the monitoring device according to the first embodiment.

The concrete example will be described under the assumption of a status where there are a corner formed by walls 1201 and 1202, a pipe 1203 erected by the wall 1202, and a valve 1204 fixed on the side of the pipe 1203 around the monitoring device 100 as shown in FIG. 12.

FIG. 11 is a flowchart of self-localization estimation processing. This self-localization estimation processing is performed by the self-localization estimation unit 401 of the monitoring device 100, that is, by the processor 301's executing a program stored in the memory 302.

First, the processor 301 twice integrates the acceleration detected by the acceleration sensor 105, and estimates the current self-localization by adding the obtained result to the previous time value of the self-localization (at the process 1101). Hereinafter, the self-localization estimated at the process 1101 will be referred to as "a first estimated self-localization".

Next, the processor 301 supposes various self-localizations, and supposes the positions of structural objects inside a building such as the walls and the columns under the condition of each of the various self-localizations. Subsequently, the processor 301 performs collating (scan matching) between the supposed structural objects inside the building such as the walls and columns and a three-dimensional measurement result obtained by the laser range finder 102. Of the various positions, one that has the highest similarity is estimated as the self-localization (at the process 1102). The self-localization estimated at the process 1102 will be referred to as "a second estimated self-localization" In addition, a statistical error distribution of the second estimated self-localization is calculated on the basis of the degrees of conformities of self-localizations that have deviations from the position that gives the highest similarity.

Figure 13:
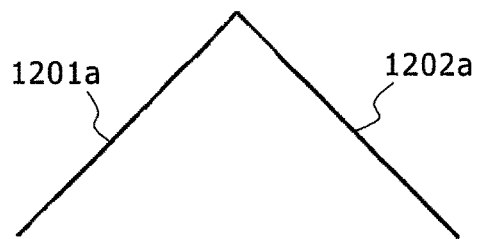
FIG. 13 is a diagram for explaining the self-localization estimation processing according to the first embodiment.

For example, in a status shown in FIG. 12, a map for localization 411 includes wall data 1201a and 1202a corresponding to the walls 1201 and 1202 as shown in FIG. 13.

Figure 14:
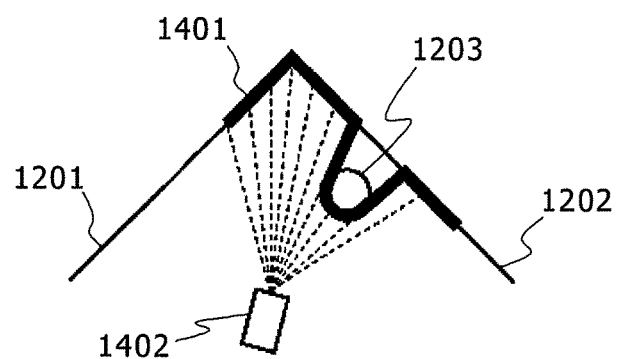
FIG. 14 is a diagram for explaining the self-localization estimation processing according to the first embodiment.

In FIG. 14, a three-dimensional measurement result 1401 obtained by the laser range finder 102 is shown in a bold line. The three-dimensional measurement result 1401 is a collection of many measurement points corresponding to parts of the walls 1201 and 1202, a part of the valves 1203 that are irradiated with the laser. A reference sign 1402 in FIG. 14 shows the position of the range finder 102, that is, the self-localization.

Figure 15:
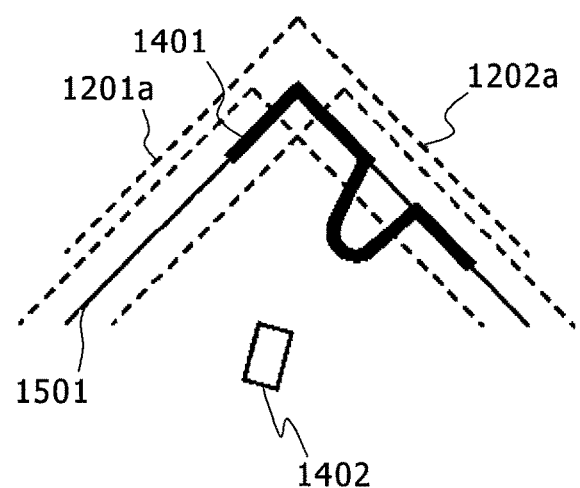
FIG. 15 is a diagram for explaining the self-localization estimation processing according to the first embodiment.

As shown in FIG. 15, the processor 301 supposes various positions of the walls 1201 and 1202 shown in dashed lines by moving in parallel and rotating the wall data 1201a and 1202a read out from the map for localization 411 with the use of an affine transformation.

The processor 301 collates each of the positions of the supposed wall data 1201a and 1202a with the three-dimensional measurement result 1401, and calculates a similarity. Subsequently, the processor 301 obtains a position 1501 that has the highest similarity. As shown in FIG. 14, because the relation between the three-dimensional measurement result 1401 and the self-localization 1402 is known, the self-localization 1402 can be estimated with the use of the three-dimensional measurement result 1401 and the position 1501 that has the highest similarity with the three-dimensional measurement result 1401.

In addition, the processor 301 calculates the error distribution of the estimated self-localization (the second estimated self-localization) on the basis the distribution of the degrees of conformities of the positions that have deviations from the position 1501 that gives the highest similarity.

Next, the processor 301 unifies the first and second estimated self-localization s with the use of a Kalman filter to estimate the most likely position as the self-localization (at the process 1103).

Figure 16:
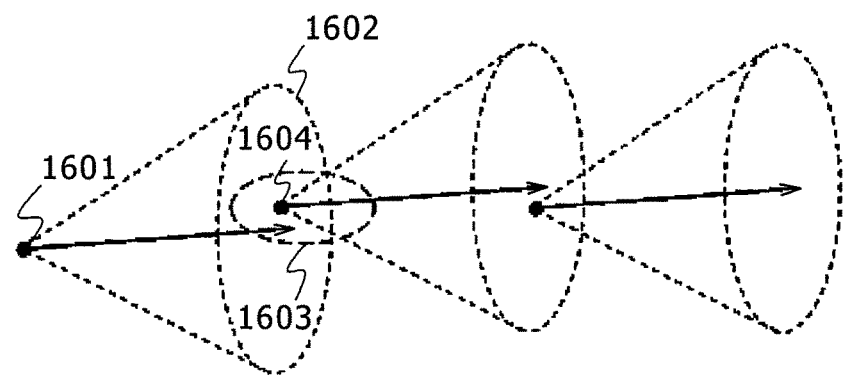
FIG. 16 is a diagram for explaining the self-localization estimation processing according to the first embodiment.

FIG. 16 is a diagram for explaining an example of the above self-localization estimation processing. Here, although FIG. 16 is a two-dimensional map, the actual processing is three-dimensionally performed.

A first estimated self-localization is obtained by adding the value obtained by twice integrating the value of an acceleration measured by the acceleration sensor 105 to a self-localization 1601 estimated in the previous time. Because the value measured by the acceleration sensor 105 has a statistical error, the first estimated self-localization has a variation too. An ellipse 1602 shows an error distribution of the first estimated self-localization.

A second estimated self-localization is estimated by performing collating (scan matching) between the result of a three-dimensional measurement obtained by the laser range finder 102 and the map for localization 411, and the second estimated self-localization also has a variation based on a statistical error as is the case with the first estimated self-localization. An ellipse 1603 shows the error distribution of the second estimated self-localization.

In the above-described two pieces of self-localization estimation processing, the first and second estimated self-localizations that respectively have variations are unified with the use of the Kalman filter, and the most likely position, that is, a position that has the largest value in the error distribution obtained after the unification is estimated as the self-localization. In the above example, a position 1604 that has the largest value in the error distribution obtained after the unification is estimated as the self-localization.

In the above self-localization estimation processing, the self-localization is momentarily estimated by repeating the above processing.

Figure 17:
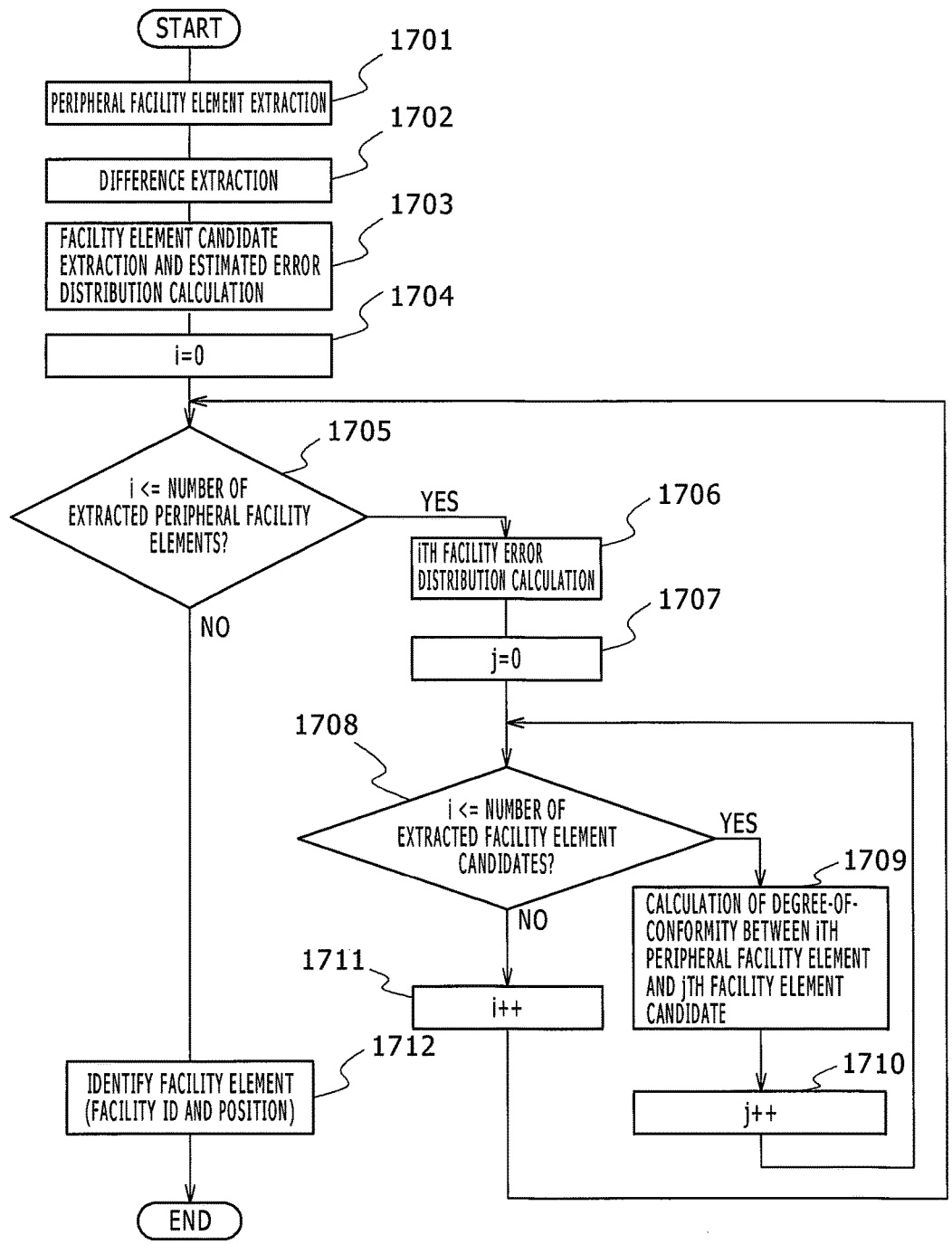
FIG. 17 is the flowchart of facility element identification processing according to the first embodiment.

FIG. 17 is a flowchart showing facility element identification processing. This facility element identification processing is performed by the facility element identification 402, that is, by the processor 301's executing a program stored in the memory 302.

First, the processor 301 extracts the facility IDs, shape types, and positions and sizes of peripheral facility elements on the basis of self-localization s estimated by the self-localization estimation processing with reference to the facility element collation map 412 (at the process 1701). In the status shown in FIG. 12, the pipe 1203 and the valve 1204 are extracted as peripheral facility elements.

Next, the processor 301 extracts a difference between a three-dimensional measurement result (a group of measurement points) obtained by the laser range finder 102 and the map for localization 411 (at the process 1702). With the above extraction, the group of measurement points regarding structural objects within a building such as walls and columns are removed from the group of measurement points obtained by the three-dimensional measurement, and only a group of measurement points regarding the facility elements is extracted.

Figure 18:
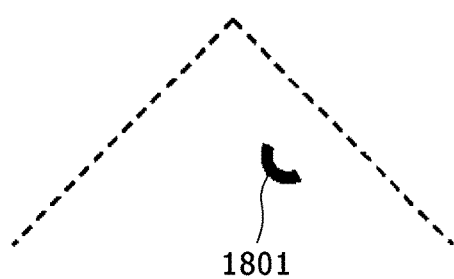
FIG. 18 is a diagram for explaining facility element identification processing according to the first embodiment.

FIG. 18 is a diagram showing a difference extracted by the process 1702 in the example shown in FIG. 12. The difference includes only a curve 1801 corresponding to a part of the pipe 1203. Here, although the valve 1204 should be essentially reflected in the difference, a part of the difference owing to the valve 1204 is omitted for simplicity of explanation.

Figure 19:
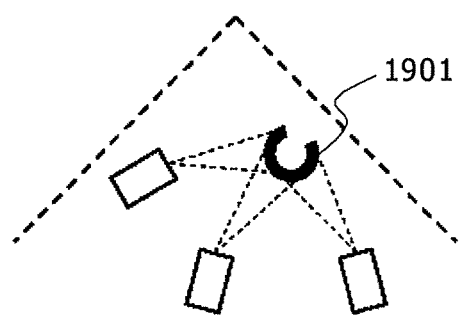
FIG. 19 is a diagram for explaining facility element identification processing according to the first embodiment.

In addition, although the example shown in FIG. 18 is a diagram showing the difference extracted from the three-dimensional measurement result obtained by a single scanning performed by the laser range finder 102, it is conceivable that results obtained by scannings performed by the laser range finder 102 located at plural positions as shown in FIG. 19 are superimposed to make a superimposed result and a difference 1901 is extracted from the superimposed result. With the use of the superimposed result, the accuracy of the extraction of facility element candidates performed at the next process 1703 is improved.

Next, the processor 301 detects and extracts the shapes and positions of facility element candidates of a plane, a circular cylinder, and the like from the difference extracted by the process 1702 with the use of the least-squares method, the Hough conversion method, or the like. In addition, the facility element candidate extraction unit 504 calculates estimation error distributions that are statistical errors included in the extracted facility element candidates as well (at the process 1703). For example, in the case where a facility element candidate is extracted with the use of the least-squares method, the processor 301 calculates an estimation error distribution by adding a tinge of a known self-localization estimation error to the sum of the square errors.

Figure 20:
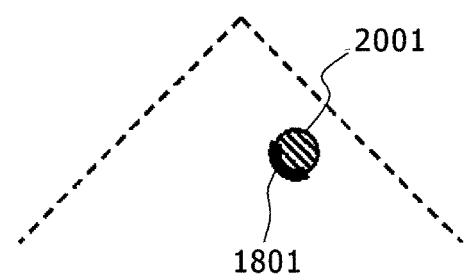
FIG. 20 is a diagram for explaining facility element identification processing according to the first embodiment.

FIG. 20 is a diagram showing a result extracted by detecting the shape and position of a facility element candidate from the difference shown in FIG. 18. In this example, a circular cylinder 2001 corresponding to the pipe 1203 and its position are detected and extracted from the difference.

Next, the processor 301 obtains parameters (variances and a correction coefficient) regarding the installation error for each of the peripheral facility elements extracted by the process 1701 with reference to the statistical model for installation error 413, and calculates an estimated installation error distribution (at the process 1706). Subsequently, for each of all the combinations of the peripheral facility elements extracted at the process 1701 and the facility element candidates extracted at the process 1703, the processor 301 unifies the corresponding installation error distribution and estimated error distribution, and calculates a similarity between both error distributions (at the process 1709). A similarity is the maximum value of the unified error distribution.

In the actual processes, the processor 301 calculates degrees of conformity for all the combinations of the peripheral facility elements extracted at the process 1701 and the facility element candidates extracted at the process 1703 with the use of counters i and j (at the processes 1704 to 1711).

Subsequently, the processor 301 calculates a combination of a peripheral facility element and a facility element candidate that has the largest similarity, and identifies to which peripheral facility element extracted at the process 1701 the facility element extracted at the process 1703 corresponds. In other words, the processor 301 identifies the facility ID of the facility element under monitoring. In addition, the processor 301 identifies a position that gives the maximum value in the error distribution of the above combination as the position of the facility element under monitoring (at the process 1712).

Figure 21:
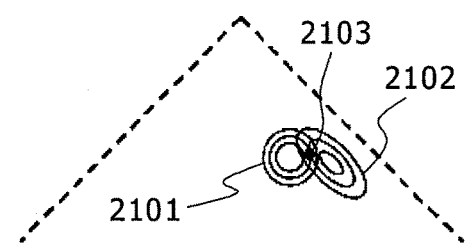
FIG. 21 is a diagram for explaining facility element identification processing according to the first embodiment.

FIG. 21 is a diagram showing the way the facility ID and position of the facility element in the status shown in FIG. 12 are identified.

In the status shown in FIG. 12, a part corresponding to the pipe 1203 is extracted as a facility element candidate (a circular cylinder) from the three-dimensional measurement result, and its error distribution depicts the concentric rings of contours 2101 with the center axis of the circular cylinder as their center.

On the other hand, the pipe 1203 is extracted as a peripheral facility element from the facility element collation map 412, and the installation error distribution of the pipe 1203 is represented by the ellipses of contours 2102 with the center axis of the pipe 1203 as their center on the basis of parameters regarding installation errors obtained from the statistical model for installation error 413. The shape of the installation error distribution depicts the ellipses. This is because, for example, owing to the restrictions on the construction method of the installation of the pipe 1203, while the distance between the pipe 1203 and the wall is strictly regulated, the installation error of the pipe 1203 in the direction parallel with the wall is comparatively tolerated.

The processor 301 unifies two error distributions by multiplying one error distribution by the other error distribution at each position, and calculates the largest value of the unified distribution as a similarity between the facility element candidate and the pipe 1203. If the similarity of the combination is higher than that of any combination, the facility element under monitoring is identified as the pipe 1203, and a position 2103 where the error distribution has the largest value is identified as the position of the pipe 1203.

FIG. 22 is a diagram showing a display example of the display 201 in the status shown in FIG. 12.

A superimposed image, which is a visible light image on which a temperature distribution is superimposed and created by the image superimposition unit 407, is displayed in the left area of the display 201. A part of each facility element exceeding its upper limit temperature 2201 is displayed with color. In this example, the valve 1204 exceeds its upper limit temperature, so that the valve 1204 is displayed in red.

A schematic diagram 2202 created by the image superimposition unit 407 is displayed in the right area of the display 201. In this example, the valve 1204 exceeds its upper limit temperature, so that, because the valve 1204 is judged to be abnormal, a part corresponding to the valve 1204 in the schematic diagram 2202 is enclosed by a red circle 2203.

An operator can confirm that the facility elements under monitoring are the pipe 1203 and the valve 1204 on the basis of these images displayed on the display 201, and in addition, he/she can confirm that an abnormality has been occurred at the valve 1204.

As described above, according to the first embodiment of the present invention, the monitoring device 100 can not only estimate the self-localization, but also can identify what are the facility elements under monitoring and even their positions. In other words, the corresponding relationship between a facility element under monitoring and the corresponding facility element managed by the monitoring system 1 can be secured with a high reliability.

In the estimation of a self-localization, plural self-localizations estimated from measurement results obtained with the use of plural sensors (such as the laser range finder 102 and the acceleration sensor 105) are statistically unified, so that the final self-localization can be estimated and a for localization map for localization used for estimating the self-localization includes only structural objects with small errors inside a building. As a result, the self-localization can be estimated with a high degree of accuracy, with the result that the accuracy of identifying facility elements performed using the estimated result of the self-localization can be improved.

In addition, there is a possibility that positions at which facility elements are actually installed deviate from the corresponding positions stored in the facility CAD because of installation errors, so that it is difficult to identify the facility elements only by collating the three-dimensional result with the facility CAD. According to the first embodiment of the present invention, however, the installation error distribution of a facility element is taken into consideration when the facility element is identified. Therefore, even if there is the installation error, the facility element can be identified.

In addition, because it is possible to identify what is a facility element candidate under monitoring, whether the facility element is abnormal or not can be judged by comparing the measured temperature of the facility element with a normal temperature range preset regarding the facility element. Therefore, an operator can take appropriate measures depending on the facility element.

Second Embodiment

Next, a second embodiment of the present invention will be described.

Figure 23:
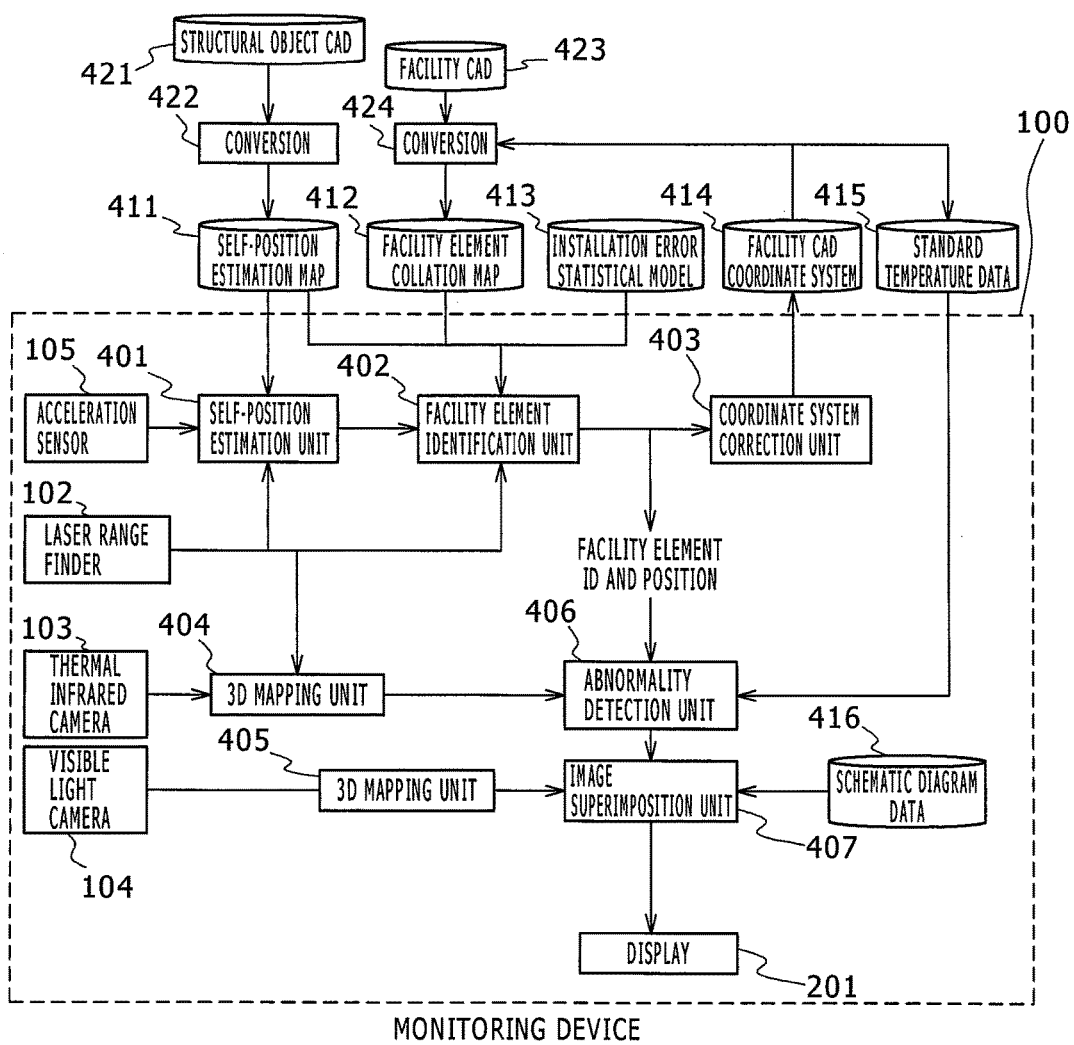
FIG. 23 is a function block diagram showing the logical configuration of a monitoring device according to a second embodiment.

FIG. 23 is a function block diagram showing the logical configuration of a monitoring device 100 according to a second embodiment of the present invention. Parts enclosed by a dashed line are parts implemented on the monitoring device 100.

While the data 411 to 415 are stored in the storage device 303 of the monitoring device 100 in the first embodiment, the data 411 to 415 are stored in the storage device 313 of the server 120 in the second embodiment.

The monitoring device 100 requests the server 120 to send data necessary for pieces of processing performed in the function units 401 to 407 out of the data 411 to 415, and the server 120 sends the requested data to the monitoring device 100. The monitoring device 100 performs the pieces of processing in the function units 401 to 407 with the use of the received data.

Because other configurations (hardware configurations, processing contents in the function units 401 to 407) are the same as those of the first embodiment, their explanation will be omitted.

In addition, although all of the data 411 to 415 are configured to be included in the server 120 in the second embodiment, it is conceivable that parts of the data 411 to 415 are included in the monitoring device 100. In addition, it is also conceivable that the schematic diagram 416 is included in the server 120.

Third Embodiment

Next, a third embodiment of the present invention will be described.

Figure 24:
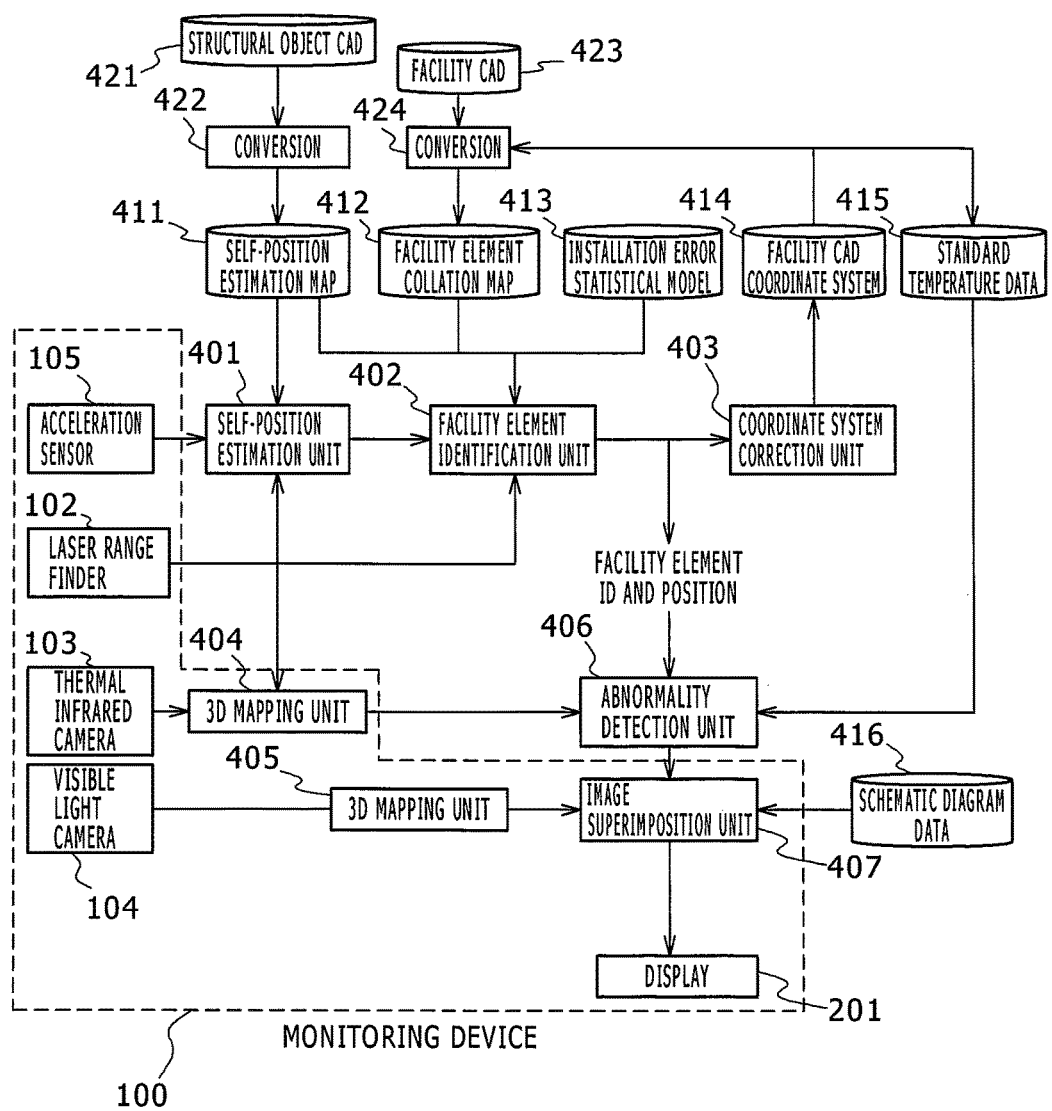
FIG. 24 is a function block diagram showing the logical configuration of a monitoring device according to a third embodiment.

FIG. 24 is a function block diagram showing the logical configuration of the monitoring device 100 according to a third embodiment of the present invention. Parts enclosed by a dashed line are parts implemented on the monitoring device 100.

Programs to implement all the data 411 to 416, the self-localization estimation unit 401, the facility element identification unit 402, the coordinate system correction unit 403, and the abnormality detection unit 406 are stored in the memory device 313 of the server 120. These function units 401 to 403 and 406 are implemented in the server 120 through these programs' being read out by the memory 312 of the server 120 and being executed by the processor 311.

During the monitoring operation of a facility element, the monitoring device 100 sends a measurement result obtained by the sensors 102 to 105 to the server 120, and the server 120 performs pieces of processing such as the self-localization estimation processing and the facility element identification processing on the basis of the received measurement result from the monitoring device 100. Subsequently, the server 120 sends results of the above pieces of processing (such as the results of the self-localization estimation, the facility element identification, and the abnormality detection) to the monitoring device 100. The monitoring device 100 works upon the results received from the server 120 at the image superimposition unit 407, and displays the worked-upon results on the display 201.

Because other configurations (hardware configurations, processing contents in the function units 401 to 407) are the same as those of the first embodiment, their explanation will be omitted.

In addition, although the self-localization estimation unit 401, the facility element identification unit 402, the coordinate system correction unit 403, and the abnormality detection unit 406 are implemented in the server 120 in the third embodiment, it is conceivable that parts of these units are included in the monitoring device 100.

In addition, although the 3D mapping units 404 and 405 and the image superimposition unit 407 are implemented in the monitoring device 100, it is conceivable that a part or all of the above units are implemented in the server 120.

Although the present invention has been described in detail with reference to the accompanying drawings, the present invention is not limited to the concrete configurations as above, and it is to be understood that various modifications and equivalents within the spirit of the scope of the accompanying claims may be included.

For example, although the laser range finder 102 is used to measure a peripheral three-dimensional shape in the above-described embodiments, another type of sensor may be used to measure the peripheral three-dimensional shape. For example, there may be used a method in which a parallax image created from two images obtained by two cameras, a method in which the changes of features are analyzed on the basis of plural images obtained by one moving camera, or the like.

In addition, it is also conceivable that an operator three-dimensionally measures the inside of a building using the laser range finder 102 while moving around the inside of the building before starting monitoring, so that only parts corresponding to walls, columns, and the like are extracted from the measurement result and the map for localization 401 is created.

In addition, although the monitoring device 100 measures the temperature of a facility element, and compares the measured temperature with the corresponding lower limit and upper limit temperatures so as to judge whether the facility element is abnormal or not in the above-described embodiments, it is conceivable that the monitoring device 100 measures another physical quantity (such as sound, vibration, or color) and judges whether the facility element is abnormal or not on the basis of the measured physical quantity.

The invention claimed is:

1. A monitoring device for monitoring one or more facility elements in a building, comprising:
   a laser range finder to measure a three-dimensional shape in a periphery of the monitoring device;
   a physical quantity sensor to measure a physical quantity of a facility element under monitoring from among the facility elements in the periphery of the monitoring device;
   a visible light camera to capture a visible light image of the facility element under monitoring in the periphery of the monitoring device;
   a memory storing instructions and storing a localization map including shapes and positions of structural objects inside the building other than shapes and positions of the facility elements, a facility element collation map including the shapes and positions of the facility elements inside the building, standard physical quantity data of the facility elements, schematic diagram data for the facility elements and connections thereof, and an installation error statistical data including a plurality of error distributions of the facility elements;
   a processor connected to the memory, the visible light camera, the physical quantity sensor, and the laser range finder; and
   a display unit connected to the processor,
   wherein the memory stores instructions that, when executed by the processor, cause the processor to:
   estimate a position of the monitoring device by collating the measured three-dimensional shape with the localization map including the shapes and positions of the structural objects inside the building other than the shapes and positions of the facility elements;
   extract the facility elements in the periphery of the estimated position from the facility element collation map including the shapes and positions of the facility elements inside the building;
   extract a shape and position of a facility element candidate from the measured three-dimensional shape;
   calculate a plurality of similarities between the shapes and positions of each of the facility elements in the periphery of the estimated position extracted from the facility element collation map and the shape and position of the facility element candidate extracted from the measured three-dimensional shape based on a plurality of error distributions of the shape and position of the facility elements in the periphery of the estimated position and an error distribution of the shape and position of the facility element candidate extracted from the measured three-dimensional shape;
   identify, as the facility element under monitoring, one of the facility elements in the periphery of the estimated position extracted from the facility element collation map that corresponds to the facility element candidate extracted from the measured three-dimensional shape based on the calculated similarities;
   calculate a three-dimensional physical quantity distribution based on the measured physical quantity and the measured three-dimensional shape;
   compare the measured physical quantity with the stored standard physical quantity data of the facility element under monitoring and determine whether the measured physical quantity of the facility element under monitoring is abnormal;
   calculate a three-dimensional visible light image based on the captured visible light image and the measured three-dimensional shape;
   create a superimposed image of the measured physical quantity of the facility element under monitoring and the three-dimensional visible light image, and convert the superimposed image into a two-dimensional image; and
   display the two-dimensional image and a schematic diagram including the facility element under monitoring and the connections thereof based on the schematic diagram data on a same screen of the display unit,
   wherein, when the measured physical quantity of the facility element under monitoring is abnormal, the facility element under monitoring is highlighted in the two-dimensional image and the schematic diagram.

2. The monitoring device according to claim 1,
   wherein the physical quantity sensor is an infrared light camera to measure a temperature of the facility element under monitoring, and
   wherein, when the measured temperature of the facility element under monitoring is abnormal, the facility element under monitoring is highlighted in the two-dimensional image and the schematic diagram.

3. The monitoring device according to claim 1, wherein the calculation of the similarities includes:
   unifying the error distributions of the shapes and positions of the facility elements in the periphery of the estimated position and the error distribution of the shape and position of the facility element candidate extracted from the measured three-dimensional shape by multiplying the error distribution of the shape and position of the facility element candidate with each of the error distributions of the shapes and positions of the facility elements in the periphery of the estimated position, and
   wherein the one of the facility elements in the periphery of the estimated position that corresponds to the facility element candidate has a maximum value among the unified error distributions.

4. The monitoring device according to claim 1,
   wherein the memory further stores instructions that, when executed by the processor, cause the processor to:
   calculate a deviation between the localization map and the facility element collation map on the basis of the position of the identified facility element under monitoring, and corrects the facility element collation map so that the deviation is reduced.

5. The monitoring device according to claim 1,
   wherein at least one of the map for localization and the facility element collation map is held by a server, and wherein the memory further stores instructions that, when executed by the processor, cause the processor to:

obtain at least one of the localization map and the facility element collation map from the server.

6. A monitoring system or monitoring one or more facility elements in a building, the monitoring system comprising:
a monitoring device including:
a laser range finder to measure a three-dimensional shape in a periphery of the monitoring device,
a physical quantity sensor to measure a physical quantity of a facility element under monitoring from among the facility elements in the periphery of the monitoring device, and
a visible light camera to capture a visible light image of the facility element under monitoring in the periphery of the monitoring device,
a first processor connected to the memory, the visible light camera, the physical quantity sensor, and the laser range finder, and
a first memory connected to the processor; and
a server wirelessly connected to the monitoring device, and including:
a second processor; and
a second memory connected to the second processor,
wherein the first memory and the second memory store instructions that, when executed by one of the first processor and the second processor, cause one of the first processor and the second processor to:
estimate a position of the monitoring device by collating the measured three-dimensional shape with a localization map including shapes and positions of structural objects inside the building other than the shapes and positions of the facility elements;
extract the facility elements in the periphery of the estimated position from a facility element collation map including the shapes and positions of the facility elements inside the building;
extract a shape and position of a facility element candidate from the measured three-dimensional shape;
calculate a plurality of similarities between the shapes and positions of each of the facility elements in the periphery of the estimated position extracted from the facility element collation map and the shape and position of the facility element candidate extracted from the measured three-dimensional shape based on a plurality of error distributions of the shapes and positions of the facility elements in the periphery of the self-localization and an error distribution of the shape and position of the facility element candidate extracted from the measured three-dimensional shape;
identify, as the facility element under monitoring, one of the facility elements in the periphery of the estimated position extracted from the facility element collation map that corresponds to the facility element candidate extracted from the measured three-dimensional shape based on the calculated similarities;
calculate a three-dimensional physical quantity distribution based on the measured physical quantity and the measured three-dimensional shape;
compare the measured physical quantity with standard physical quantity data of the facility element under monitoring and determine whether the measured physical quantity of the facility element under monitoring is abnormal;
calculate a three-dimensional visible light image based on the captured visible light image and the measured three-dimensional shape;
create a superimposed image of the measured physical quantity of the facility element under monitoring and the three-dimensional visible light image, and convert the superimposed image into a two-dimensional image; and
display the two-dimensional image and a schematic diagram including the facility element under monitoring and the connections thereof on a same screen of the display unit,
wherein, when the measured physical quantity of the facility element under monitoring is abnormal, the facility element under monitoring is highlighted in the two-dimensional image and the schematic diagram.

7. The monitoring system according to claim 6,
wherein the physical quantity sensor is an infrared light camera to measure a temperature of the facility element under monitoring, and
wherein, when the measured temperature of the facility element under monitoring is abnormal, the facility element under monitoring is highlighted in the two-dimensional image and the schematic diagram.

8. The monitoring system according to claim 6,
wherein the calculation of the similarities includes:
unifying the error distributions of the shapes and positions of the facility elements in the periphery of the estimated position and the error distribution of the shape and position of the facility element candidate extracted from the measured three-dimensional shape by multiplying the error distribution of the shape and position of the facility element candidate with each of the error distributions of the shapes and positions of the facility elements in the periphery of the estimated position, and
wherein the one of the facility elements in the periphery of the estimated position that corresponds to the facility element candidate has a maximum value among the unified error distributions.

9. The monitoring system according to claim 6,
wherein the memory further stores instructions that, when executed by the processor, cause the processor to:
calculate a deviation between the localization map and the facility element collation map on the basis of the position of the identified facility element under monitoring, and corrects the facility element collation map so that the deviation is reduced.

10. The monitoring system according to claim 6,
wherein the first processor is caused to estimate the position of the monitoring device, extract the facility elements in the periphery of the estimated position, calculate the plurality of similarities, and identify, as the facility element under monitoring, the one of the facility elements in the periphery of the estimated position,
wherein the second memory stores at least one of the localization map and the facility element collation map,
wherein the first memory and the second memory store instructions that, when executed by the first processor and the second processor, cause the first processor to:
obtain at least one of the localization map and the facility element collation map from the server.

11. The monitoring system according to claim 6,
wherein the second processor is caused to estimate the position of the monitoring device, extract the facility elements in the periphery of the estimated position, calculate the plurality of similarities, and identify, as the facility element under monitoring, the one of the facility elements in the periphery of the estimated position, and wherein the second memory stores the localization map and the facility element collation map.

12. A monitoring method for monitoring one or more facility elements in a building with a monitoring device, the monitoring method comprising the steps of:
- measuring a three-dimensional shape in the periphery of the monitoring device with a laser range finder of the monitoring device;
- measuring a physical quantity of a facility element under monitoring from among the facility elements in the periphery of the monitoring device with a physical quantity sensor of the monitoring device;
- capturing a visible light image of the facility element under monitoring in the periphery of the monitoring device with a visible light camera of the monitoring device;
- estimating a position of the monitoring device by collating the measured three-dimensional shape with a localization map including shapes and positions of structural objects inside the building other than the shapes and positions of the facility elements;
- extracting the facility elements in the periphery of the estimated position from a facility element collation map including the shapes and positions of the facility elements inside the building;
- extracting the shape and position of a facility element candidate from the measured three-dimensional shape;
- calculating a plurality of similarities between the shapes and positions of each of the facility elements in the periphery of the estimated position extracted from the facility element collation map and the shape and position of the facility element candidate extracted from the measured three-dimensional shape based on a plurality of error distributions of the shapes and positions of the facility elements in the periphery of the self-localization and an error distribution of the shape and position of the facility element candidate extracted from the measured three-dimensional shape;
- identifying, as the facility element under monitoring, one of the facility elements in the periphery of the estimated position extracted from the facility element collation map that corresponds to the facility element candidate extracted from the measured three-dimensional shape based on the calculated similarities;
- calculating a three-dimensional physical quantity distribution based on the measured physical quantity and the measured three-dimensional shape;
- comparing the measured physical quantity with standard physical quantity data of the facility element under monitoring and determine whether the measured physical quantity of the facility element under monitoring is abnormal;
- calculating a three-dimensional visible light image based on the captured visible light image and the measured three-dimensional shape;
- creating a superimposed image of the measured physical quantity of the facility element under monitoring and the three-dimensional visible light image, and converting the superimposed image into a two-dimensional image; and
- displaying the two-dimensional image and a schematic diagram including the facility element under monitoring and the connections thereof on a same screen of the display unit,
- wherein, when the measured physical quantity of the facility element under monitoring is abnormal, the facility element under monitoring is highlighted in the two-dimensional image and the schematic diagram.

13. The monitoring method according to claim 12,
wherein the physical quantity sensor is an infrared light camera to measure a temperature of the facility element under monitoring, and
wherein, when the measured temperature of the facility element under monitoring is abnormal, the facility element under monitoring is highlighted in the two-dimensional image and the schematic diagram.

14. The monitoring method according to claim 12, wherein the calculation of the similarities includes:
- unifying the error distributions of the shapes and positions of the facility elements in the periphery of the estimated position and the error distribution of the shape and position of the facility element candidate extracted from the measured three-dimensional shape by multiplying the error distribution of the shape and position of the facility element candidate with each of the error distributions of the shapes and positions of the facility elements in the periphery of the estimated position, and
- wherein the one of the facility elements in the periphery of the estimated position that corresponds to the facility element candidate has a maximum value among the unified error distributions.

15. The monitoring method according to claim 12, further comprising:
- calculating a deviation between the localization map and the facility element collation map on the basis of the position of the identified facility element under monitoring, and corrects the facility element collation map so that the deviation is reduced.

* * * * *